(12) United States Patent
Luecke et al.

(10) Patent No.: US 11,874,761 B2
(45) Date of Patent: Jan. 16, 2024

(54) APPARATUS AND METHOD TO ASSIGN THREADS TO A PLURALITY OF PROCESSOR CORES FOR VIRTUALIZATION OF A HARDWARE CONFIGURATION

(71) Applicant: THE BOEING COMPANY, Chicago, IL (US)

(72) Inventors: Kenn Robert Luecke, St. Peters, MO (US); Jonathan Nicholas Hotra, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 16/716,727

(22) Filed: Dec. 17, 2019

(65) Prior Publication Data
US 2021/0182180 A1    Jun. 17, 2021

(51) Int. Cl.
| | |
|---|---|
| *G06F 11/36* | (2006.01) |
| *G06N 20/00* | (2019.01) |
| *G06F 9/455* | (2018.01) |
| *G06F 9/48* | (2006.01) |

(52) U.S. Cl.
CPC ...... *G06F 11/3664* (2013.01); *G06F 9/45558* (2013.01); *G06F 9/4881* (2013.01); *G06N 20/00* (2019.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,015,564 B1 * | 9/2011 | Beyer | G06F 9/505 718/100 |
| 8,527,970 B1 | 9/2013 | Luecke | |
| 9,003,405 B1 | 4/2015 | Hotra | |
| 9,317,331 B1 * | 4/2016 | Koh | G06F 9/5066 |
| 2005/0044319 A1 * | 2/2005 | Olukotun | G06F 9/30047 711/118 |

(Continued)

FOREIGN PATENT DOCUMENTS

EP    3007065 A2    4/2016

OTHER PUBLICATIONS

"Extended European Search Report Received For Application No. 20214183.4", dated May 7, 2021, 10 Pages.
(Continued)

*Primary Examiner* — Wynuel S Aquino
(74) *Attorney, Agent, or Firm* — Jordan IP Law, LLC (57) ABSTRACT

An apparatus includes a memory configured to store one or more parameters associated with assignment of threads of a first program. Assignment of threads can be configured through a user interface or machine learning. The apparatus further includes a plurality of processor cores coupled to the memory. One or more of plurality of processor cores have a first hardware configuration and are configured to execute, during execution of the first program, a second program associated with virtualization of a second hardware configuration different than the first hardware configuration. The second program includes a scheduler executable to assign the threads of the first program to the plurality of processor cores based on the one or more parameters.

20 Claims, 5 Drawing Sheets

(56) References Cited

U.S. PATENT DOCUMENTS

| | | | | |
|---|---|---|---|---|
| 2007/0189308 A1* | 8/2007 | Tchigevsky | ......... | H04L 61/6022 |
| | | | | 370/396 |
| 2015/0007187 A1* | 1/2015 | Shows | .................. | G06F 9/5088 |
| | | | | 718/104 |
| 2017/0083375 A1* | 3/2017 | Martins | .................. | G06F 9/5044 |
| 2017/0205863 A1* | 7/2017 | Lee | ....................... | G06F 1/3206 |
| 2017/0322870 A1* | 11/2017 | Hotra | .................. | G06F 11/3664 |
| 2018/0082212 A1* | 3/2018 | Faivishevsky | ......... | G06N 5/003 |

OTHER PUBLICATIONS

Vanderleest, Steven H., "ARINC 653 hypervisor11," In Proceedings of Digital Avionics Systems Conference (DASC), 2010 IEEE/AIAA 29th, IEEE, Piscataway, NJ, USA, Oct. 3, 2010, 20 pages.

Heistand, Christopher, et al., "DevOps for Spacecraft Flight Software," In Proceedings of 2019 IEEE Aerospace Conference, IEEE, Mar. 2, 2019, pp. 1-16.

Hotra, Jonathan, "QEMU: Virtualization witn Emulation," International Council on Systems Engineering, Dec. 12, 2013, 1 pg.

* cited by examiner

APPARATUS AND METHOD TO ASSIGN THREADS TO A PLURALITY OF PROCESSOR CORES FOR VIRTUALIZATION OF A HARDWARE CONFIGURATION

FIELD

The present disclosure is generally related to electronic devices and more specifically to electronic devices that include processor cores that execute threads of a program.

BACKGROUND

Testing tools are used to simulate or test operation of software programs. To illustrate, in some test environments, a test bed system includes hardware that executes a software program during a test and records or measures performance of the software program during the test. In some cases, an error (e.g., a bug) can be detected during the test, and the software program can be updated to correct the error.

In some circumstances, hardware included in the test bed system differs from target hardware associated with the software program. For example, in some cases, the software program is designed for execution by an end user device having a different hardware configuration than the test bed system. In this case, a simulation or test performed using the test bed system can be inaccurate or unreliable.

Certain testing techniques modify the software program or the test environment to match the software program to the test bed system. For example, in some test environments, hardware of the test bed system executes an emulation program that emulates the target hardware configuration associated with the software program. In some cases, emulation of the target hardware configuration reduces performance of the test bed system, such as by slowing the test. As a result, results of the test can be delayed, and the cost of the test is increased.

SUMMARY

In a particular example, an apparatus includes a memory configured to store one or more parameters associated with assignment of threads of a first program. The apparatus further includes a plurality of processor cores coupled to the memory. One or more of the plurality of processor cores have a first hardware configuration and are configured to execute, during execution of the first program, a second program associated with virtualization of a second hardware configuration that is different from the first hardware configuration. The second program includes a scheduler executable to assign the threads of the first program to the plurality of processor cores based on the one or more parameters.

In another example, a method includes receiving one or more parameters associated with assignment of threads of a first program to one or more of a plurality of processor cores having a first hardware configuration. The method further includes, during execution of the first program, executing a second program associated with virtualization of a second hardware configuration that is different from the first hardware configuration. Execution of the second program includes assigning, by a scheduler of the second program, threads of the first program to the plurality of processor cores based on the one or more parameters.

In another example, a computer-readable medium stores instructions executable by a processor to initiate, perform, or control operations. The operations include receiving one or more parameters associated with assignment of threads of a first program to one or more of a plurality of processor cores having a first hardware configuration. The operations further include executing a second program, during execution of the first program, associated with virtualization of a second hardware configuration that is different from the first hardware configuration. Execution of the second program includes assigning, by a scheduler of the second program, threads of the first program to the plurality of processor cores based on the one or more parameters.

DETAILED DESCRIPTION

A virtualization system in accordance with the disclosure is a first hardware system (e.g., a first computing device) that executes software to virtualize (e.g., represent or emulate) a second hardware system (e.g., a second computing device, also referred to as a target system). The virtualization system emulates a target hardware configuration of the target system by executing a virtualization program that presents a virtualized representation of the target hardware configuration to a target program (e.g., a program configured to be executed on the target system). For example, in some implementations, a test bed can use a virtualization system to test a target software application that is to be executed on the target system. In such implementations, the test bed executes the virtualization program and executes the target program while the virtualization program is executing. The virtualization program controls the target program's access to computing resources by presenting a virtual set of computing resources representing the target hardware configuration to the target program. To illustrate, the target program assigns execution of threads to processing resources by sending instructions to the virtualization program. The virtualization program, in turn, communicates with the underlying computing resources (e.g., actual hardware resources, such as processor cores) of the virtualization system, which can have a hardware configuration that is very different from the target hardware configuration.

Virtualizing a target hardware configuration can be used for various reasons. For example, software that is intended to execute on the target hardware can often be tested more readily by executing the software in a virtualize representation of the target hardware because virtualization enables monitoring of underlying operations of the target program and the target hardware. As another example, virtualization can be used to speed up the testing. To illustrate, the virtualization program can cause multiple computing operations to be performed in parallel at multiple processing cores of the virtualization system rather than sequentially at processing cores of the target hardware configuration. As another illustration, the virtualization program can move threads to different processing cores of the virtualization system if moving execution of the threads is expected to decrease execution time of a test of the target program.

Virtualization can also be used to improve the fidelity of simulators or trainers (e.g., computing devices that simulate a hardware environment to monitor user interaction with the hardware environment). For example, it is generally desirable for a flight simulator to accurately mimic the operation of a simulated aircraft. Rather than using actual aircraft line replaceable units (e.g., flight control computers) from the simulated aircraft to mimic operation of the simulated aircraft, the flight simulator executes a flight control application that includes the control laws used by the simulated aircraft. However, the flight simulator also has to perform a large number of other operations, such as simulating environmental effects (e.g., lighting and weather) and physics modeling, that actual aircraft systems do not. The virtualization system of the flight simulator controls access to actual hardware resources in order to ensure that each operation needed to simulate operation of the aircraft is executed in a timely, efficient, and accurate manner.

In some implementations, the virtualization program includes a scheduler that enables selection of one or more parameters that increase efficiency (e.g., speed or fidelity) of execution of, or testing of, the target program. As an example, in some implementations, the one or more parameters indicate rules for mapping (also referred to herein as mapping rules) of a particular thread of the target program to a particular processor core of the virtualization system (e.g., the flight simulator hardware or a test bed system). In some examples, the mapping rules allow rescheduling a thread of the target program from a more frequently used processing core of the virtualization system to a less frequently used processing core of the virtualization system (e.g., so that the less frequently used core is used more often, increasing speed of execution of the target program or a test of the target program). Alternatively, or in addition, in some examples, a frequently executed thread of the target program is rescheduled to allow a less frequently executed thread of the target program to execute (e.g., so that the less frequently executed thread is executed more often, increasing speed of execution of the target program or a test of the target program).

To further illustrate, in some examples, the one or more parameters indicate one or more threads of the target program that are eligible (or ineligible) to be moved to an under-utilized processor core of the virtualization system. Alternatively, or in addition, in some examples, the one or more parameters indicate a length of time that a thread is to execute to be eligible (or ineligible) to be moved to an under-utilized processor core of the virtualization system. Alternatively, or in addition, in some examples, the one or more parameters indicate a condition for moving a thread to another core of the of the virtualization system, a core that is eligible (or ineligible) to execute the thread, or both. Accordingly, a technical effect of a system in accordance with aspects of the disclosure is increased speed of execution of a target program or of a test of the target program (e.g., by rescheduling a less frequently used thread so that the less frequently used thread is allowed to execute, thus reducing or preventing a stall condition or "bottleneck"). Another technical effect of a system in accordance with aspects of the disclosure is increased fidelity of virtualization of a particular hardware configuration (e.g., by increasing accuracy of the virtualization of the particular hardware configuration).

Depending on the particular example, the one or more parameters can be designated by a software developer of the target program, a test engineer operating the virtualization system, another user, or a combination thereof, as illustrative examples. In another example, the one or more parameters are determined by a particular program, such as a machine learning program. To illustrate, in one example, a machine learning program analyzes tests of multiple target programs having one or more common characteristics and "learns" a particular processing core that is more frequently used or less frequently used as compared to other processing cores during the tests. The machine learning program can also determine which threads benefit from being moved to other processing cores, time limits or other execution thresholds that indicate when a thread may benefit from being moved, etc.

Although certain examples are described herein with reference to the virtualization system being used as a test bed system, in other examples, a virtualization system can be implemented in other systems, such as an embedded system that is contained within a vehicle. In some cases, an embedded system can have a hardware configuration that cannot be easily modified with software and therefore operates poorly with certain software programs. As a particular example, in some cases, an embedded system (e.g., a system of a vehicle) can be difficult and expensive to upgrade. For example, a flight management computer (FMC) that runs an operational flight program (OFP) on board an aircraft may have to undergo recertification if the FMC or OFP are modified. In some implementations, a virtualization system can replace the FMC by virtualizing the hardware configuration of the FMC to execute the OFP. In this example, the virtualization system may be recertified, but the OFP need not undergo recertification. As an aircraft fleet ages, newer computing systems become available and legacy systems (e.g., older processors) can be difficult to procure. Virtualizing the legacy systems can reduce the impact (e.g., the cost and time) associated with the upgrading difficult to procure legacy systems.

Particular aspects of the disclosure are described further below with reference to the drawings. In the description, common features are designated by common reference numbers. Various terminology is used for the purpose of describing particular implementations only and is not intended to be limiting of implementations. For example, the singular forms "a," "an," and "the" are intended to include the plural forms as well, unless the context clearly indicates otherwise. The terms "comprises" and "comprising" are used interchangeably with "includes" or "including." Additionally, the term "wherein" is used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Further, terms such as "determining", "calculating", "shifting", "adjusting", etc. can be used to describe how one or more operations are performed. It should be noted that such terms are not to be construed as limiting and other techniques can be utilized to perform similar operations.

Additionally, as referred to herein, "generating", "calculating", "using", "selecting", "accessing", and "determining" can be used interchangeably. For example, "generating", "calculating", or "determining" a parameter (or a signal) can refer to actively generating, calculating, or determining the parameter (or the signal) or to using, selecting, or accessing the parameter (or signal) that is already generated, such as by another component or device.

Figure 1:
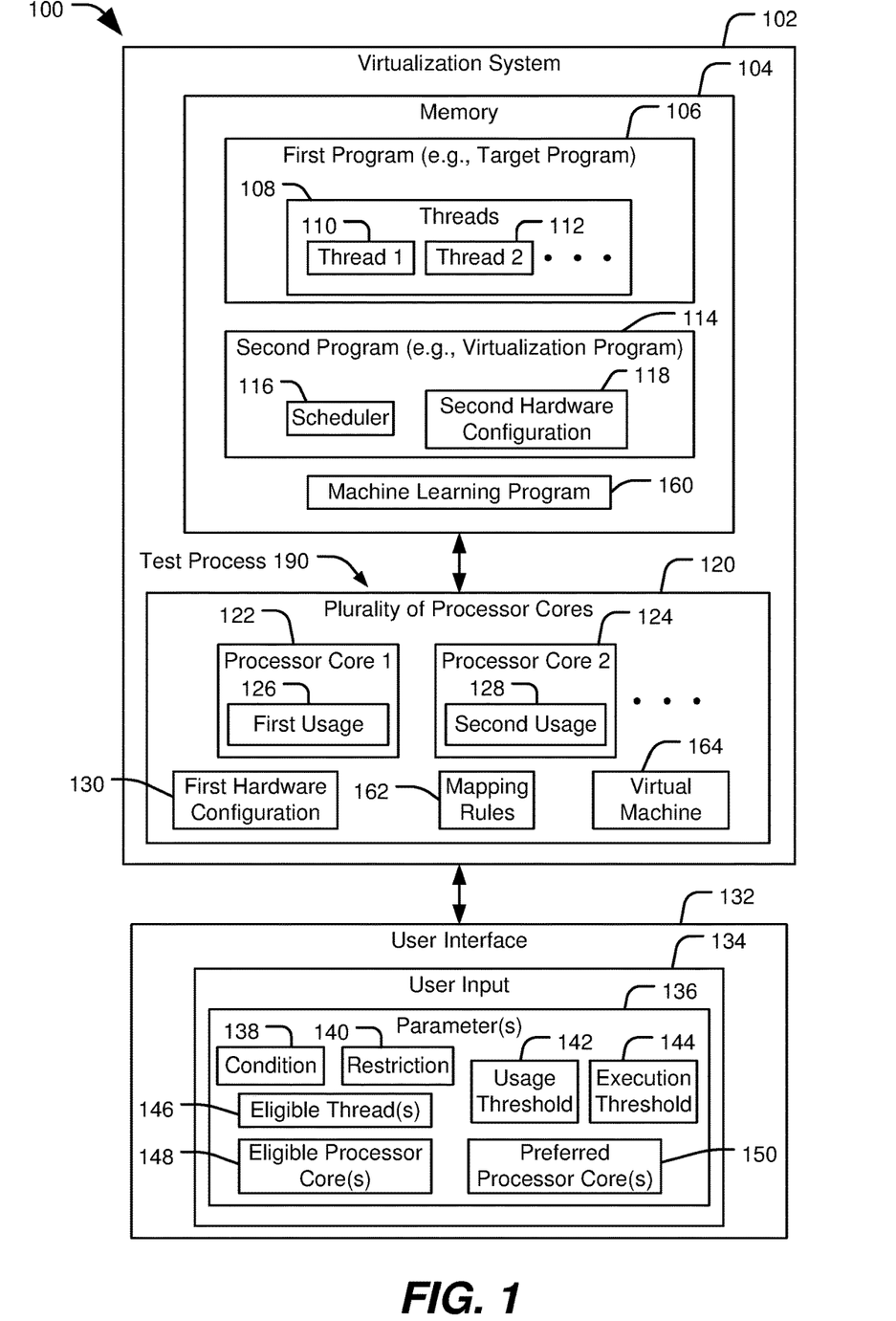
FIG. 1 is a block diagram illustrating an example of a system configured to reschedule threads to processor cores in accordance with aspects of the disclosure.

Referring to FIG. 1, a particular example of a system configured to reschedule threads to processor cores is depicted and generally designated 100. The system 100 includes a memory 104 and a plurality of processor cores 120 coupled to the memory 104. In some implementations, the memory 104 and the plurality of processor cores 120 are included in a virtualization system 102 (e.g., a test bench system, an embedded system, or a simulator).

To illustrate, in a particular example, the virtualization system 102 is configured to test an operational flight program (OFP) that is to be executed by an aircraft system, such as a flight management computer (FMC). In some examples, the virtualization system 102 has a "generic" hardware configuration that differs from a hardware configuration of the aircraft system. In this case, the virtualization system 102 executes a virtualization program to virtualize or emulate the hardware configuration of the aircraft system. In some systems, emulation of the hardware configuration reduces test performance, such as by slowing the test, delaying results of the test, or increasing the cost of the test. A technique in accordance with certain aspects of the disclosure reschedules thread execution to increase speed of a virtualized test, as explained further below.

In some examples, the plurality of processor cores 120 includes one or more central processing unit (CPU) processing cores, one or more graphics processing unit (GPU) processing cores, one or more digital signal processor (DSP) processing cores, one or more other processor cores, or a combination thereof. In FIG. 1, the plurality of processor cores 120 includes two processor cores, such as a first processor core 122 and a second processor core 124. In other examples, the plurality of processor cores 120 can include more than two processor cores.

One or more of the plurality of processor cores 120 have a first hardware configuration 130. To illustrate, in some examples, the first hardware configuration 130 corresponds to a particular number or size of one or more caches included in or available to the plurality of processor cores 120, a frequency of a clock signal provided to the plurality of processor cores 120, an instruction set architecture (ISA) associated with the plurality of processor cores 120, a pipeline configuration of the plurality of processor cores 120, one or more other characteristics, or a combination thereof.

One or more of the plurality of processor cores 120 are configured to execute a second program 114 (e.g., a virtualization program) to generate a virtual environment, such as a virtual machine 164. In a particular example, the plurality of processor cores 120 is configured to execute the second program 114 to virtualize a second hardware configuration 118 different than the first hardware configuration 130. As used herein, the first hardware configuration 130 can refer to a configuration (e.g., a type of hardware) of the virtualization system 102 that is different from another configuration (e.g., another type of hardware) corresponding to the second hardware configuration 118. In an illustrative example, the second hardware configuration 118 corresponds to a configuration of an FMC.

The virtual machine 164 is configured to execute a first program 106 (e.g., a target program, such as an OFP to be executed by an FMC, as an illustrative example). In a particular example, the memory 104 is configured to store the first program 106, and the virtual machine 164 is configured to read the first program 106 from the memory 104. In some implementations, the virtual machine 164 is configured to execute the first program 106 during a test process 190 (e.g., a debugging process, a simulation process, or another test) of the first program 106. To further illustrate, in a particular non-limiting example, the virtualization system 102 is configured to receive the first program 106 from a computer of a software developer of the first program 106 with a request to test the first program 106.

In a particular example, the virtual machine 164 emulates the second hardware configuration 118 so that execution of the first program 106 is similar to the second hardware configuration 118 (or more similar to the second hardware configuration 118 as compared to the first hardware configuration 130). For example, in some cases, hardware of the virtualization system 102 differs from hardware of target hardware on which the first program 106 is designed (e.g., by a computer of a software developer) to execute. In this example, the plurality of processor cores 120 can execute the second program 114 during the test process 190 of the first program 106 in order to increase fidelity, performance, speed, or accuracy of the test process 190 (as compared to performing the test process 190 without virtualization of the second hardware configuration 118).

As a particular example, in some cases, a particular test process 190 of the first program 106 may depend on some, but not all, aspects of the second hardware configuration 118. As a particular example, in some implementations, the second hardware configuration 118 specifies (among other characteristics) a single-core hardware configuration that uses a single processor core of the plurality of processor cores 120. If a particular test process 190 of the first program 106 does not depend on whether the threads 108 are executed using one processor core or using multiple processor cores, then the test process 190 can be unnecessarily slowed by limiting the test process 190 to a single-core hardware configuration specified by the second hardware configuration 118. Further, in some conventional systems, modification of behavior (or execution) of the second program 114 for each test process 190 may be expensive or infeasible (e.g., if source code access is unavailable). As a result, in such conventional systems, execution of the threads 108 is slowed (e.g., stalled) as a result of emulating the second hardware configuration 118 (e.g., by avoiding scheduling of the threads 108 to the second processor core 124 in order to emulate a single-core hardware configuration). In accordance with some aspects of the disclosure, the one or more parameters 136 are used to override one or more aspects of the second program 114 and the second hardware configuration 118 (e.g., one or more aspects that are unimportant to a particular test process 190 of the first program 106).

As a particular non-limiting example, in some implementations, the first hardware configuration 130 specifies that each processor core of the plurality of processor cores 120 has unrestricted access to a particular resource (e.g., a cache or a memory), and the second hardware configuration 118 specifies that each processor core of the plurality of processor cores 120 is to share the particular resource with other processor cores of the plurality of processor cores 120. To illustrate, further in some examples, the second hardware configuration 118 corresponds to a particular number or size of one or more caches that differs from the first hardware configuration 130, a frequency of a clock signal that differs from the first hardware configuration 130, an instruction set architecture (ISA) that differs from the first hardware configuration 130, a pipeline configuration that differs from the first hardware configuration 130, one or more other characteristics that differ from the first hardware configuration 130, or a combination thereof.

The second program 114 includes a scheduler 116. The scheduler 116 is executable to assign threads 108 of the first program 106 to the plurality of processor cores 120. For example, in some implementations, the scheduler 116 is executable to assign (or re-assign) threads 108 to the plurality of processor cores 120 based on one or more parameters 136. In some examples, the one or more parameters 136 modify (or override) certain scheduling default operations by the scheduler 116 during execution of the second program 114 in order to increase fidelity, performance, speed, or accuracy of simulation of the second hardware configuration 118 (as compared to scheduling the default operations during execution of the second program 114). As used herein, a "thread" may refer to a particular set of instructions that is executable to perform a particular process that is manageable by a scheduler (e.g., the scheduler 116) independently of one or more other particular sets of instructions.

In a particular example, the memory 104 is configured to store the one or more parameters 136, and the virtual machine 164 is configured to read the one or more parameters 136 from the memory 104. In some implementations, the one or more parameters 136 are included in metadata or in one or more files, such as a configuration file (e.g., a .ini file), a test data file, a database file (e.g., a flat file), one or more other files, or a combination thereof, as illustrative examples. To further illustrate, in some examples, the metadata indicates one or more cores of the plurality of processor cores 120 that are eligible to execute a particular thread of the first program 106 (e.g., by indicating primary, secondary, and tertiary cores to execute the particular thread), one or more cores of the plurality of processor cores 120 that are not eligible to execute a particular thread of the first program 106, one or more cores of the plurality of processor cores 120 that are eligible to execute a particular thread of the first program 106 subject to one or more conditions, or a combination thereof. As a particular example, a particular condition may indicate a rule (e.g., one of the mapping rules 162), such as a rule specifying that a particular thread of the first program 106 is not to execute until another particular thread of the first program 106 has completed execution.

To further illustrate, in some examples, the virtualization system 102 is configured to receive the one or more parameters 136 as user input 134 via a user interface 132, such as a graphical user interface (GUI), as an illustrative example. In such examples, a user (e.g., a software developer, a test engineer, or another user) can specify one or more scheduling operations of the scheduler 116 by inputting the one or more parameters 136 as the user input 134 via the user interface 132. As a particular example, in some implementations, a test engineer can monitor the test process 190 of the first program 106 and modify the test process 190 and/or test execution using the one or more parameters 136 (e.g., by increasing a number of processor cores of the plurality of processor cores 120 used to execute the first program in response to determining that performance of the test process 190 is relatively slow or not executing as expected).

Alternatively or in addition, the one or more parameters 136 can be received or determined using one or more other techniques. To illustrate, in one example, a machine learning program 160 is executable (e.g., by the plurality of processor cores 120 or by another processing device) to determine the one or more parameters 136, such as by "learning" characteristics associated with the second hardware configuration 118. In some examples, the machine learning program 160 monitors or receives training data based on execution of multiple programs having one or more common characteristics. The machine learning program 160 is trained to identify a particular processing core of the plurality of processor cores 120 that is more frequently used or less frequently used as compared to other processing cores of the plurality of processor cores 120, and to adjust the mapping rules 162 based on this information. As another example, the machine learning program 160 identifies one or more threads of the first program 106 that can be moved to different processing cores or identifies conditions (e.g., threshold conditions) that indicate when a particular thread would benefit from being moved to another processing core.

In some examples, the one or more parameters 136 are determined using multiple sources, such as using both the user input 134 and the machine learning program 160. For example, in some implementations, the machine learning program 160 is executable to provide parameter suggestions to a user (e.g., via the user interface 132) that can be confirmed, disconfirmed, or modified by the user to determine the one or more parameters 136. As another example, the user input 134 defines the mapping rules 162 and the machine learning program 160 selects a particular subset of the mapping rules 162 that are expected to provide good performance based on the training data used to train the machine learning program 160.

In another example, the machine learning program 160 is executable to "check" one or more parameters indicated by a user via the user input 134. To illustrate, in one example, the machine learning program 160 compares one or more parameters indicated by the user input 134 to one or more parameters determined by the machine learning program 160 independently of the user input 134. In some examples, a particular parameter of the one or more parameters indicated by the user input 134 can differ from the one or more parameters determined by the machine learning program 160 (e.g., where a thread-to-core mapping specified by the user input 134 is not present in a mapping rule 162 determined by the machine learning program 160). In some examples, machine learning program 160 is executable to prompt a user (e.g., via the user interface 132) to confirm the particular parameter.

To further illustrate, in some examples, the scheduler 116 is executable to reschedule a particular thread (e.g., a first thread 110 or a second thread 112) of the first program 106, based on the one or more parameters 136, from execution by the first processor core 122 to execution by the second processor core 124. In some examples, rescheduling execution of the particular thread for execution by the second processor core 124 decreases execution time or increases fidelity of virtualization of the second hardware configuration 118 as compared to execution of the particular thread by the first processor core 122. As used herein, rescheduling execution of a thread can include changing execution of the thread from one processor core to another processor core, changing an order of execution of the thread and one or more other threads by a particular processor core, performing one or more other operations, or a combination thereof.

As a non-limiting example, in some implementations, a particular type of resource (e.g., a particular type of processing core) available in the first hardware configuration 130 may be unavailable in the second hardware configuration 118. In one particular example, the second processor core 124 corresponds to a particular type of processing core (e.g., a CPU processing core, a GPU processing core, a DSP processing core, or another type of processing core) that is unavailable in the second hardware configuration 118. In this case, the one or more parameters 136 can indicate that the scheduler 116 is to exclude the second processor core 124 from executing one or more of the threads 108 of the first program 106.

In some implementations, the one or more parameters 136 specify a particular condition 138 for rescheduling a thread of the first program 106 from execution by the first processor core 122 to execution by the second processor core 124. As a particular example, in some implementations, the particular condition 138 corresponds to a determination, during execution of the first program 106, that a first usage 126 of the first processor core 122 satisfies a usage threshold 142, that a second usage 128 of the second processor core 124 fails to satisfy the usage threshold 142, or both. As a non-limiting illustrative example, one or both of the first usage 126 and the second usage 128 can correspond to or indicate a particular level of processor utilization (e.g., a percentage of time that a processor core is busy) by the first processor core 122 and the second processor core 124, respectively, during execution of the first program 106, and the usage threshold 142 has a value corresponding to a threshold processor utilization value, such as ninety percent utilization, as an illustrative, non-limiting example. In another non-limiting illustrative example, one or both of the first usage 126 and the second usage 128 can correspond to or indicate an estimated power consumption by the first processor core 122 or by the second processor core 124, respectively, and the usage threshold 142 indicates a threshold power consumption value. The usage threshold 142 can be compared to the first usage 126, to the second usage 128, or both, to determine whether to reschedule a thread from execution by the first processor core 122 to execution by the second processor core 124.

Alternatively or in addition, in some examples, the one or more parameters 136 specify an execution threshold 144 for rescheduling execution of a particular thread of the first program 106 from the first processor core 122 to the second processor core 124. In a particular example, the execution threshold 144 indicates a threshold time value (e.g., an amount of time that is allocated for completion of each thread or for a set of tasks of each thread) that can be compared to an amount of time the particular thread is executed at the first processor core 122 to determine whether to reschedule execution of the particular thread to the second processor core 124.

Alternatively or in addition, in some examples, the one or more parameters 136 specify one or more of a particular thread of the first program 106 that is eligible for rescheduling by the scheduler 116, a particular processor core of the plurality of processor cores 120 that is eligible to execute the particular thread, or a preferred processor core of the plurality of processor cores 120 to execute the particular thread. For example, in FIG. 1, the one or more parameters 136 include an eligible thread indication 146 of a particular thread of the first program 106 that is eligible for rescheduling by the scheduler 116. To illustrate, in some implementations, each thread of the first program 106 is associated with a corresponding index value, and the eligible thread indication 146 includes data specifying the index value of a particular thread of the first program 106. In some examples, a user (e.g., a software developer, a test engineer, or another user) can specify the eligible thread indication (e.g., by inputting the one or more parameters 136 as the user input 134 via the user interface 132). As another example, FIG. 1 also depicts that the one or more parameters 136 include an eligible thread processor core indication 148 of a particular processor core of the plurality of processor cores 120 that is eligible to execute the particular thread. As an additional example, in FIG. 1, the one or more parameters 136 include a preferred processor core indication 150 of a particular processor core of the plurality of processor cores 120 to execute the particular thread. In some examples, the particular processor core indicated by the preferred processor core indication 150 has better performance as compared to other processor cores of the plurality of processor cores 120 (reducing execution time of a test process 190 of the first program 106).

Alternatively or in addition, in some examples, the one or more parameters 136 specify a restriction 140. In some examples, the restriction 140 identifies a thread of the first program 106 that is not to be rescheduled by the scheduler 116.

In a particular example, the one or more parameters 136 indicate or are used to determine the mapping rules 162 of threads of the first program 106 to processor cores of the plurality of processor cores 120. In some implementations, the mapping rules 162 indicate reassignment of one or more threads of the threads 108 of the first program 106 to one or more processor cores of the plurality of processor cores 120 based on the one or more parameters 136, such as based on one or more of the particular condition 138, the restriction 140, the usage threshold 142, the execution threshold 144, eligible thread indication 146, the eligible thread processor core indication 148, the preferred processor core indication 150, or one or more other parameters.

In some examples, the mapping rules 162 are determined prior to execution of the first program 106 (e.g., prior to accessing the first program 106 from the memory 104 or prior to runtime of the first program 106). Alternatively, or in addition, in some implementations, the mapping rules 162 are determined or modified (e.g., selected) during execution of the first program 106. To illustrate, in some examples, the first usage 126 and the second usage 128 are monitored during execution of the first program 106. In some examples, the mapping rules 162 are modified (e.g., a different set of mapping rules 162 are selected) in response to determining that the first usage 126 of the first processor core 122 satisfies the usage threshold 142, that the second usage 128 of the second processor core 124 fails to satisfy the usage threshold 142, or both.

In some examples, the mapping rules 162 include a matrix indicating eligibility of each thread of the threads 108 of the first program 106 to be executed by each processor core of the plurality of processor cores 120. In such examples, a "1" value (or a "0" value) of a particular entry of the matrix can indicate that a particular thread of the threads 108 of the first program 106 is eligible (or ineligible) to be executed by a particular processor core of the plurality of processor cores 120. Alternatively, or in addition, in another illustrative example, the mapping rules 162 include a matrix indicating execution priority of threads of the threads 108, execution priority of processor cores of the plurality of processor cores 120, other information, or a combination thereof. As an example, a particular value of a particular entry of the matrix can indicate that a mapping between a particular thread of the threads 108 of the first program 106 and a particular processor core of the plurality of processor cores 120 is a primary mapping (e.g., a preferred mapping), and another value of another entry of the matrix can indicate that another mapping between the particular thread and another processor core of the plurality of processor cores 120 is a secondary mapping (e.g., a less preferred mapping).

In some examples, the machine learning program 160 is executable to receive input that indicates any of the one or more parameters 136 and to identify, based on the input, one or more mappings of the threads 108 to the plurality of processor cores 120. In some examples, the one or more mappings are based on the mapping rules 162. In some implementations, the machine learning program 160 uses a plurality of weights (e.g., values between a lower bound and a higher bound) associated with a set of conditions and restrictions (e.g., the condition 138 and the restriction 140). In a particular example, each condition and restriction is associated with a particular weight that is used to determine a score (e.g., where a greater weight is associated with a greater score). In some examples, the score is used to identify a particular processor core of the plurality of processor cores 120 that is to execute a rescheduled thread of the threads 108. In some examples, the machine learning program 160 is trained to select a "best" mapping (e.g., a mapping corresponding to a highest predicted execution performance) of the threads 108 to the plurality of processor cores 120. In some implementations, user input can be received (e.g., via the user interface 132) confirming or disconfirming a particular mapping identified by the machine learning program 160 (e.g., where a user is prompted via the user interface 132 to confirm or disconfirm a particular mapping identified by the machine learning program 160). In some examples, user input disconfirming a particular mapping identified by the machine learning program 160 initiates adjustment of the plurality of weights of the machine learning program 160 (e.g., by prompting a user to adjust the plurality of weights to facilitate "learning" by the machine learning program 160). To further illustrate, in some implementations, the machine learning program 160 is executable to perform one or more artificial intelligence (AI) operations using one or more neural networks or a genetic algorithm, as illustrative examples.

One or more aspects described with reference to FIG. 1 can improve performance of a system (e.g., the virtualization system 102) as compared to other techniques. For example, by rescheduling one or more threads of the threads 108 and/or one or more of the plurality or processor cores 120 based on the one or more parameters 136, speed of a test process 190 of the first program 106 can be increased, reducing cost of the testing, increasing fidelity of the test, or both.

Figure 2:
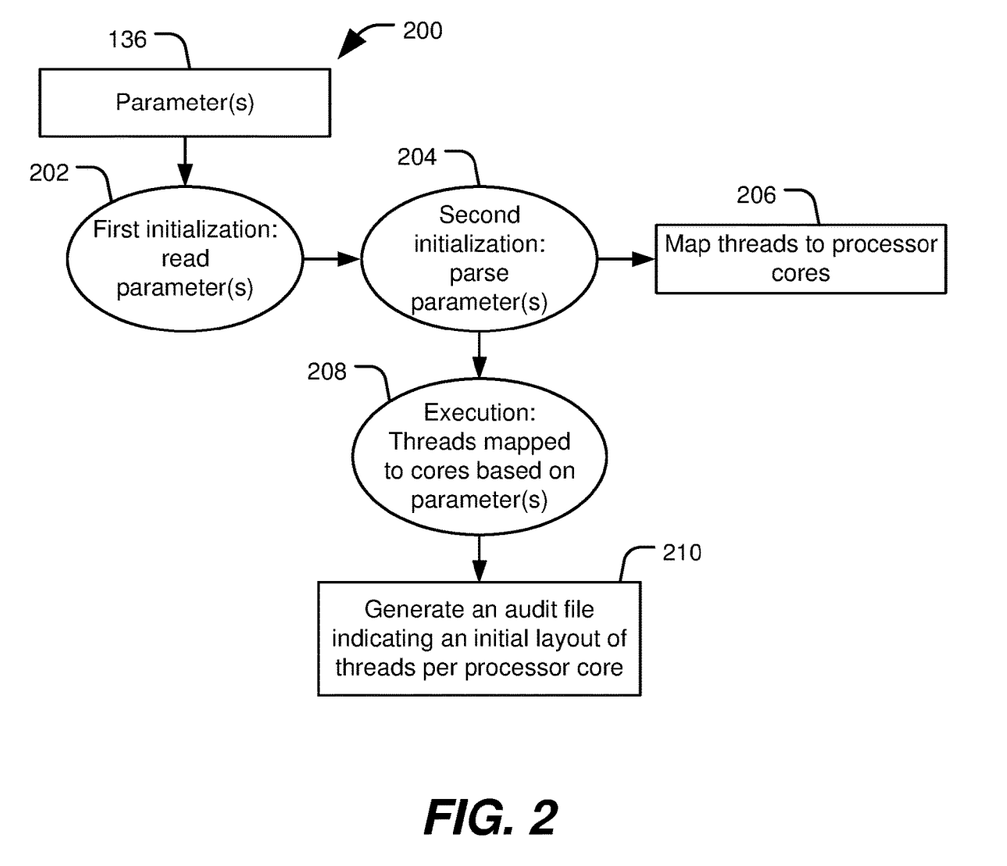
FIG. 2 is a data flow diagram illustrating examples of operations performed by the system of FIG. 1 in accordance with aspects of the disclosure.

Referring to FIG. 2, certain examples of operations performed by the system 100 of FIG. 1 are depicted and generally designated 200. In a particular example, the operations 200 of FIG. 2 are performed by the virtual machine 164 of FIG. 1.

The operations 200 include performing a first initialization, at 202. In a particular example, the plurality of processor cores 120 performs the first initialization by reading the one or more parameters 136 from the memory 104.

The operations 200 further include performing a second initialization, at 204. In a particular example, the virtual machine 164 performs the second initialization by parsing the one or more parameters 136.

The operations 200 further include mapping threads to processor cores, at 206. To illustrate, in one example, the threads 108 of the first program 106 are mapped to processor cores of the plurality of processor cores 120 based on the one or more parameters 136, such as in accordance with the mapping rules 162. In some examples, the threads 108 of the first program 106 are mapped to processor cores of the plurality of processor cores 120 based on one or more of the particular condition 138, the restriction 140, the usage threshold 142, the execution threshold 144, eligible thread indication 146, the eligible thread processor core indication 148, the preferred processor core indication 150, or one or more other parameters.

The operations 200 further include executing the threads based on the mapping, at 208. In a particular example, the plurality of processor cores 120 (or a subset of the plurality of processor cores 120) executes the threads 108 of the first program 106 based on the mapping rules 162.

The operations 200 further include generating an audit file, at 210. In some examples, the audit file indicates an initial layout of the threads 108 of the first program per processor core of the plurality of processor cores 120. In some examples, the audit file indicates times (e.g., particular clock cycles) when a thread of the threads 108 is rescheduled from a particular processor core to another processor core of the plurality of processor cores 120. As a particular example, the audit file can indicate rescheduling of the first thread 110 from the first processor core 122 to the second processor core 124 at a particular time (e.g., a particular clock cycle of the first processor core 122 or the second processor core 124), such as in response to the first usage 126 satisfying the usage threshold 142, in response to the second usage 128 failing to satisfy the usage threshold 142, or both. In some examples, the audit file tracks static mappings of threads to cores (e.g., where the audit file records an initial mapping of threads to cores). Alternatively or in addition, in some implementations, the audit file is updated dynamically to track one or more changes to thread scheduling mappings.

One or more aspects described with reference to FIG. 2 can improve performance of a system (e.g., the virtualization system 102 of FIG. 1) as compared to other techniques. For example, by rescheduling one or more threads of the threads 108 and/or one or more of the plurality or processor cores 120 based on the one or more parameters 136, speed of a test of the first program 106 can be increased, reducing cost of the testing, increasing fidelity of the test, or both.

Figure 3:
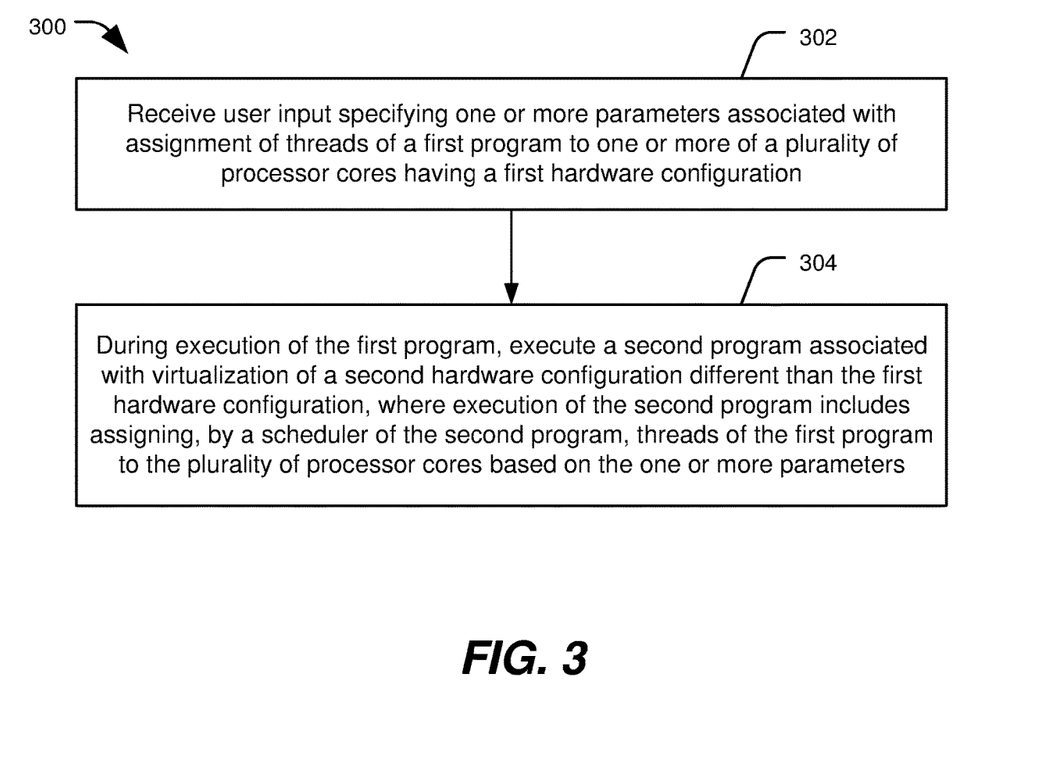
FIG. 3 is a flow chart of an example of a method of operating the system of FIG. 1 in accordance with aspects of the disclosure.

Referring to FIG. 3, a particular illustrative example of a method is depicted and generally designated 300. In a particular example, operations of the method 300 are performed by one or more of the plurality of processor cores 120 of FIG. 1.

The method 300 includes receiving one or more parameters associated with assignment of threads of a first program to one or more of a plurality of processor cores having a first hardware configuration, at 302. In a particular example, the virtual machine 164 receives the one or more parameters 136 associated with assignment of the threads 108 to one or more of the plurality of processor cores 120 having the first hardware configuration 130. In some examples, the plurality of processor cores 120 receives the one or more parameters 136 via the user input 134. In an example, the virtual machine 164 receives the one or more parameters 136 by reading the one or more parameters 136 from the memory 104. In an example, the one or more parameters 136 are determined in connection with execution of the machine learning program. In this case, the virtual machine 164 can receive the one or more parameters 136 by executing the machine learning program 160 to determine the one or more parameters 136.

In one illustrative example of the method 300, the one or more parameters 136 specify a mapping (e.g., the mapping rules 162) of a thread (e.g., the first thread 110 or the second thread 112) of the first program 106 to a particular processor core (e.g., the first processor core 122) of the plurality of processor cores 120. Alternatively or in addition, in another example of the method 300, the one or more parameters 136 specify that a frequently executed thread (e.g., the first thread 110 or the second thread 112) of the first program 106 is to be rescheduled to enable execution of a less frequently executed thread (e.g., the second thread 112 or the first thread 110) of the first program 106. Alternatively or in addition, in other examples of the method 300, the one or more parameters 136 can specify other information.

The method 300 further includes executing a second program, during execution of the first program, associated with virtualization of a second hardware configuration different than the first hardware configuration, at 304. Execution of the second program includes assigning, by a scheduler of the second program, threads of the first program to the plurality of processor cores based on the one or more parameters. To illustrate, in some examples, the plurality of processor cores 120 execute the second program 114, during execution of the first program 106, to virtualize the second hardware configuration 118, and execution of the second program 114 includes assigning, by the scheduler 116, the threads 108 to the plurality of processor cores 120 based on the one or more parameters 136.

One or more aspects described with reference to FIG. 3 can improve performance of a system (e.g., the virtualization system 102 of FIG. 1) as compared to other techniques. For example, by rescheduling one or more threads of the threads 108 and/or one or more of the plurality or processor cores 120 based on the one or more parameters 136, speed of a test of the first program 106 can be increased, reducing cost of the testing, increasing fidelity of the test, or both.

Figure 4:
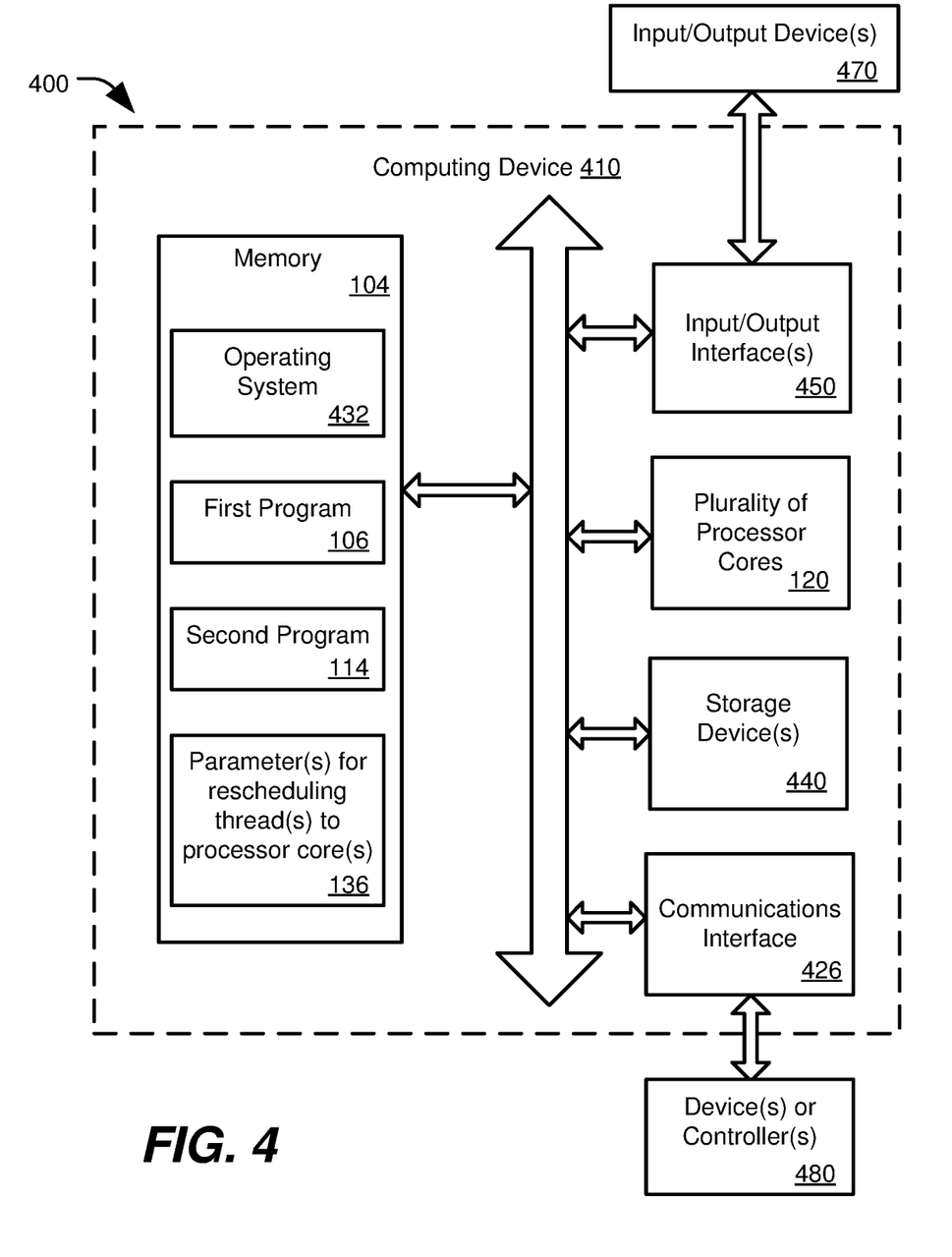
FIG. 4 is a block diagram illustrating aspects of an example of a computing system that is configured to execute instructions to initiate, perform, or control operations, such as operations of method of FIG. 3.

FIG. 4 is an illustration of a block diagram of a computing environment 400 including a computing device 410. The computing device 410 is configured to support embodiments of computer-implemented methods and computer-executable program instructions (or code) according to the disclosure. In some examples, the computing device 410, or portions thereof, is configured to execute instructions to initiate, perform, or control operations described herein, such as the operations 200 of FIG. 2, operations of the method 300 of FIG. 3, or both.

The computing device 410 includes the plurality of processor cores 120. The plurality of processor cores 120 is configured to communicate with the memory 104 (e.g., a system memory or another memory), one or more storage devices 440, one or more input/output interfaces 450, a communications interface 426, or a combination thereof.

Depending on the particular implementation, the memory 104 includes volatile memory (e.g., volatile random access memory (RAM) devices), nonvolatile memory (e.g., read-only memory (ROM) devices, programmable read-only memory, or flash memory), one or more other memory devices, or a combination thereof. In FIG. 4, the memory 104 stores an operating system 432, which can include a basic input/output system for booting the computing device 410 as well as a full operating system to enable the computing device 410 to interact with users, other programs, and other devices. In some examples, the memory 104 stores instructions executable by the plurality of processor cores 120 to transmit data or signals between components of the computing device 410, such as the memory 104, the one or more storage devices 440, the one or more input/output interfaces 450, the communications interface 426, or a combination thereof.

In some implementations, one or more storage devices 440 include nonvolatile storage devices, such as magnetic disks, optical disks, or flash memory devices. In some examples, the one or more storage devices 440 include removable memory devices, non-removable memory devices or both. In some cases, the one or more storage devices 440 are configured to store an operating system, images of operating systems, applications, and program data. In a particular example, the memory 104, the one or more storage devices 440, or both, include tangible computer-readable media.

In the example of FIG. 4, the operating system 432 is executable to communicate with the one or more input/output interfaces 450 to enable the computing device 410 to communicate with one or more input/output devices 470 to facilitate user interaction. In some implementations, the one or more input/output interfaces 450 include one or more serial interfaces (e.g., universal serial bus (USB) interfaces or Ethernet interfaces), parallel interfaces, display adapters, audio adapters, one or more other interfaces, or a combination thereof. In some examples, the one or more input/output devices 470 include keyboards, pointing devices, displays, speakers, microphones, touch screens, one or more other devices, or a combination thereof. In some examples, the plurality of processor cores 120 is configured to detect interaction events based on user input received via the one or more input/output interfaces 450. Alternatively or in addition, in some implementations, the plurality of processor cores 120 is configured to send information to a display via the one or more input/output interfaces 450.

In a particular example, the operating system 432 is executable to communicate with (e.g., send signals to) one or more devices 480 using the communications interface 426. In some implementations, the communications interface 426 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 480 include host computers, servers, workstations, one or more other computing devices, or a combination thereof.

In some examples, the computing device 410 is included in the virtualization system 102 of FIG. 1, and the plurality of processor cores 120 is configured to execute the second program 114 during execution of the first program 106 (e.g., to virtualize the second hardware configuration 118 during the test process 190). It is noted that other aspects are within the scope of the disclosure. To illustrate, in another example, the computing device 410 is included in another system (e.g., a medical device or a vehicle, as illustrative examples), and the plurality of processor cores 120 is configured to execute the second program 114 during operation of the system (e.g., to virtualize the second hardware configuration 118 during operation of the system).

Figure 5:
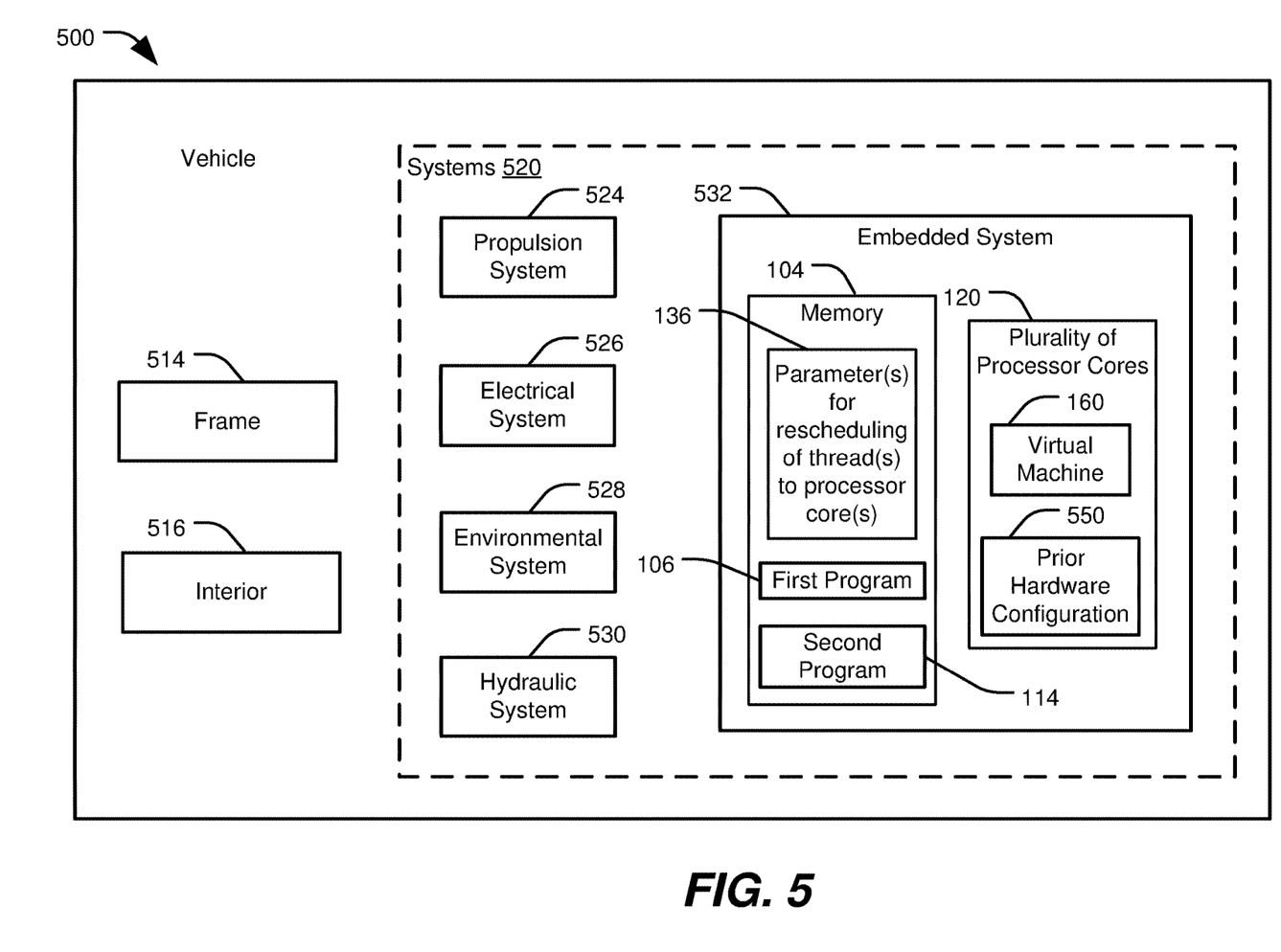
FIG. 5 is a block diagram illustrating aspects of an illustrative implementation of a vehicle that includes one or more components of the system of FIG. 1.

To further illustrate, aspects of the disclosure may be described in the context of a vehicle 500 as shown in the example of FIG. 5. In some examples, the vehicle 500 corresponds to an aircraft, a spacecraft, or a ground vehicle, as illustrative examples.

As shown in FIG. 5, the vehicle 500 includes a frame 514 (e.g., an airframe of an aircraft) with an interior 516 and a plurality of systems 520. Examples of the plurality of systems 520 include one or more of a propulsion system 524, an electrical system 526, an environmental system 528, a hydraulic system 530, and an embedded system 532. As used herein, an embedded system (e.g., the embedded system 532) may refer to a system that includes particular hardware and instructions that are developed for the particular hardware (e.g., so that the instructions are designed for execution by the particular hardware). In some cases, the software can be developed for execution by a relatively small number of types of hardware devices. In comparison, an enterprise system can include software that is developed for a relatively large number of types of hardware systems, such as an Internet web browser that is developed for a wide variety of computing devices.

In FIG. 5, the embedded system 532 includes the memory 104 and the plurality of processor cores 120. FIG. 5 also illustrates that the memory 104 can be configured to store the one or more parameters 136 usable by the plurality of processor cores 120 to reschedule one or more threads to one or more of the plurality of processor cores 120.

In some cases, the embedded system 532 has more recent (or newer) design as compared to the first program 106, and the first program 106 corresponds to a "legacy" (e.g., deprecated) program designed to execute on a prior hardware configuration 550. In this example, the embedded system 532 can execute the second program 114 (e.g., during operation of the aircraft 500) to virtualize the prior hardware configuration 550 (e.g., to virtualize a "legacy" hardware configuration that is associated with another aircraft and that is compatible with the first program 106). In another example, the embedded system 532 has a legacy hardware configuration, and the first program 106 corresponds to a more recent version (e.g., an updated version) of a particular program designed for execution by the embedded system 532. In this example, the embedded system 532 can execute the second program 114 to virtualize a more recent hardware configuration that is compatible with the first program 106.

The illustrations of the examples described herein are intended to provide a general understanding of the structure of the various implementations. The illustrations are not intended to serve as a complete description of all of the elements and features of apparatuses and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
a memory configured to store one or more parameters associated with assignment of threads of a first program; and
a plurality of processor cores coupled to the memory, one or more of the plurality of processor cores having a first hardware configuration, wherein one or more of the plurality of processor cores are configured to execute, during execution of the first program, a second program associated with virtualization of a second hardware configuration different than the first hardware configuration, and wherein the second program includes a scheduler executable to assign the threads of the first program to at least one of the plurality of processor cores based on the one or more parameters, the one or more parameters indicating one or more of the following: which processing core of the plurality of processing cores is more frequently used or less frequently used as compared to other of the plurality of processing cores, and which ones of the threads benefit from being moved to the at least one of the plurality of processing cores based at least on threads execution thresholds,
wherein a machine learning program includes a plurality of weights that are associated with a condition and a restriction associated with a first thread of the threads, wherein the first thread is scheduled to execute on a first processor core of the plurality of processor cores, wherein each of the condition and the restriction is associated with a respective, particular weight of the plurality of weights, wherein the machine learning program is to
generate a score for the first thread with the plurality of weights;
identify a second processor core of the plurality of processor cores based on the score; and
reschedule the first thread from being executed by the first processor core to being executed by the second processor core to execute on the second processor core based on the second processor core being identified based on the score.

2. The apparatus of claim 1, further comprising a virtualization system that includes the memory and the plurality of processor cores, wherein the plurality of processor cores is configured to execute the second program during a test process of the first program.

3. The apparatus of claim 1, wherein the memory and the plurality of processor cores are included in an embedded system, and wherein the plurality of processor cores is configured to execute the second program during operation of the embedded system.

4. The apparatus of claim 3, further comprising a vehicle that includes the embedded system.

5. The apparatus of claim 1, wherein the memory and the plurality of processor cores are included in a simulator or trainer.

6. The apparatus of claim 1, wherein the scheduler is further executable to reschedule a particular thread of the first program, based on the one or more parameters, from execution by a third processor core of the plurality of processor cores to execution by a fourth processor core of the plurality of processor cores.

7. The apparatus of claim 6, wherein rescheduling execution of the particular thread for execution increases fidelity of virtualization of the second hardware configuration as compared to execution of the particular thread by the first processor core.

8. The apparatus of claim 6, wherein the one or more parameters indicate a particular condition or a restriction for rescheduling execution of the particular thread of the first program, and wherein the particular condition corresponds to a determination, during execution of the first program, that a first usage of the third processor core satisfies a usage threshold, that a second usage of the fourth processor core fails to satisfy the usage threshold, or both.

9. The apparatus of claim 1, wherein the one or more parameters specify the execution thresholds for rescheduling execution of one or more of the threads of the first program from a third processor core of the plurality of processor cores to a fourth processor core of the plurality of processor cores, the execution threshold corresponding to an amount of time the one or more threads is executed.

10. The apparatus of claim 1, further comprising a user interface configured to receive the one or more parameters via user input.

11. The apparatus of claim 1, wherein the memory is further configured to store a set of instructions corresponding to the machine learning program, and the processor is further configured to execute the set of instructions to implement the machine learning program.

12. A method comprising:
receiving one or more parameters, the one or more parameters being associated with assignment of threads of a first program to one or more of a plurality of processor cores having a first hardware configuration; and
during execution of the first program, executing a second program associated with virtualization of a second hardware configuration different than the first hardware configuration, wherein execution of the second program includes assigning, by a scheduler of the second program, threads of the first program to at least one of the plurality of processor cores based on the one or more parameters, the one or more parameters indicating one or more of the following:
which processing core of the plurality of processing cores is more frequently used or less frequently used as compared to other of the plurality of processing cores, and which ones of the threads benefit from being moved to the at least one of the plurality of processing cores based at least on threads execution thresholds,
wherein a machine learning program is to: includes a plurality of weights that are associated with of a condition and a restriction associated with a first thread of the threads, wherein the first thread is scheduled to execute on a first processor core of the plurality of processor cores, wherein each of the condition and the restriction is associated with a respective, particular weight of the plurality of weights, wherein the machine learning program is to
generate a score for the first thread with the plurality of weights;
identify a second processor core of the plurality of processor cores based on the score; and
reschedule the first thread from being executed by the first processor core to being executed by the second processor core to execute on the second processor core based on the second processor core being identified based on the score.

13. The method of claim 12, wherein the one or more parameters are received via user input.

14. The method of claim 12, further comprising:
analyzing, by the machine learning program, a plurality of target programs having one or more common characteristics; and
based at least on the analyzing, generating the one or more parameters.

15. The method of claim 12, further comprising rescheduling a particular thread of the first program, based on the one or more parameters and by the scheduler, from execution by a third processor core of the plurality of processor cores to execution by a fourth processor core of the plurality of processor cores.

16. The method of claim 12, wherein one or more parameters specify that a frequently executed thread of the first program is to be rescheduled to enable execution of a less frequently executed thread of the first program.

17. The method of claim 12, wherein the one or more parameters specify an execution threshold for rescheduling execution of a thread of the first program from a third processor core of the plurality of processor cores to a fourth processor core of the plurality of processor cores.

18. The method of claim 12, wherein the one or more parameters specify a particular thread of the first program that is eligible for rescheduling by the scheduler, a particular processor core of the plurality of processor cores that is eligible to execute the particular thread, or a preferred processor core of the plurality of processor cores to execute the particular thread.

19. A computer-readable medium storing instructions executable by a processor to initiate, perform, or control operations comprising:
receiving one or more parameters associated with assignment of threads of a first program to one or more of a plurality of processor cores having a first hardware configuration;
during execution of the first program, executing a second program associated with virtualization of a second hardware configuration different than the first hardware configuration, wherein execution of the second program includes assigning, by a scheduler of the second program, threads of the first program to at least one of the plurality of processor cores based on the one or more parameters, the one or more parameters indicating one or more of the following:
which processing core of the plurality of processing cores is more frequently used or less frequently used as compared to other of the plurality of processing cores, and which ones of the threads benefit from being moved to the at least one of the plurality of processing cores based at least on threads execution thresholds,
wherein a machine learning program includes a plurality of weights that are associated with a condition and a restriction associated with a first thread of the threads, wherein the first thread is scheduled to execute on a first processor core of the plurality of processor cores, wherein each of the condition and the restriction is associated with a respective, particular weight of the plurality of weights, wherein the machine learning program is to
generate a score for the first thread with the plurality of weights;

identify a second processor core of the plurality of processor cores based on the score; and reschedule the first thread from being executed by the first processor core to being executed by the second processor core to execute on the second processor core based on the second processor core being identified based on the score.

20. The computer-readable medium of claim 19, wherein the operations further include rescheduling a particular thread of the first program, based on the one or more parameters and by the scheduler, from execution by a first processor core of the plurality of processor cores to execution by a second processor core of the plurality of processor cores.

* * * * *

UNITED STATES PATENT AND TRADEMARK OFFICE
CERTIFICATE OF CORRECTION

| | |
|---|---|
| PATENT NO. | : 11,874,761 B2 |
| APPLICATION NO. | : 16/716727 |
| DATED | : January 16, 2024 |
| INVENTOR(S) | : Kenn Robert Luecke and Jonathan Nicholas Hotra |

It is certified that error appears in the above-identified patent and that said Letters Patent is hereby corrected as shown below:

In the Claims

Column 17, Line 53, Claim 12 "program is to: includes" should be --program includes--;
Column 17, Line 54, Claim 12 "with of a" should be --with a--.

Signed and Sealed this
Twenty-seventh Day of February, 2024

Katherine Kelly Vidal
*Director of the United States Patent and Trademark Office*